United States

Muszumanski

[11] 3,891,304
[45] June 24, 1975

[54] PANCRATIC OBJECTIVE

[75] Inventors: Trude Muszumanski, Vienna; Gunter Kurz, Voesendorf; Irngard Wendisch, Vienna, all of Austria

[73] Assignees: Karl Vockenhuber, Vienna 18; Raimund Hauser, Vienna 4, both of Austria

[22] Filed: Jan. 12, 1973

[21] Appl. No.: 323,093

[30] Foreign Application Priority Data
Jan. 13, 1972 Austria .................. 282/72

[52] U.S. Cl. ............... 350/184; 350/176; 350/186
[51] Int. Cl. ........................................ G02b 15/16
[58] Field of Search ........................... 350/184, 186

[56] References Cited
UNITED STATES PATENTS
3,442,573  5/1969  Macher ..................... 350/184 X
3,464,763  9/1969  Berger ...................... 350/184 X
3,784,283  1/1974  Muszumanski et al. ............ 350/184

*Primary Examiner*—John K. Corbin
*Attorney, Agent, or Firm*—Ernest G. Montague; Karl F. Ross; Herbert Dubno

[57] ABSTRACT

A varifocal objective with a basic rear lens group of fixed focal length and an afocal front lens assembly of variable magnification ratio has a performance value $Z > 4$, with $$Z = \frac{2_y}{f_{Gmin}} \cdot \frac{f_{Gmax}}{f_{Gmin}}$$

where $2y$ is the image diagonal, $f_{Gmax}$ is the maximum overall focal length and $f_{Gmin}$ is the minimum focal length, with a varifocal ratio $f_{Gmax}/f_{Gmin}$ of about 4.7. The positively refracting first component of the four-component afocal lens assembly consists of four singlets, namely a negative meniscus, a planoconvex lens and two positive menisci, all with forwardly facing convex surfaces.

4 Claims, 3 Drawing Figures

PANCRATIC OBJECTIVE

Our present invention relates to a pancratic or varifocal objective for the super-8 format with an afocal ancillary lens system of variable magnification and a basic lens group of fixed focal length, the ancillary lens system comprising a positive first component consisting of a plurality of simple lenses, followed by negative second and third components and finally by a positive fourth component, whereas the basic lens group consists of a positive component. For changing the overall focal length, the second component situated adjacent to the positive front member is movable along the optical axis and the third component executes the compensating movement necessary to achieve a constant image plane, whereas the fourth component directs the light rays diverging behind the third component through a diaphragm area in substantially axial direction to the basic lens group.

With usual objectives of the varifocal or zoom type, difficulties arise in reducing the mechanical dimensions, namely the total axial length, as well as the diameter of the front lens group, facing the object, without losing performance. As already set fourth in Austrian Pat. No. 291,620, it is possible to express an objective of variable focal length by a performance value $Z$, which may be calculated from the formula $$Z = \frac{2y}{f_{Gmin}} \cdot \frac{f_{Gmax}}{f_{Gmin}}$$

wherein $2y$ represents the image diagonal, $f_{Gmax}$ the maximum overall focal length and $f_{Gmin}$ the minimum overall focal length of the objective. The ratio between maximum and the minimum overall focal lengths of the objective represents in known manner the varifocal or zooming range. Thus, in order to achieve the largest possible varifocal range, the performance value must be as large as possible. With predetermined values of the zooming range and the minimum focal length, the diameter of the front lens group of conventional objectives (such as that of the aforementioned Austrian patent) is dependent on the total axial length and this again to a high degree on the value of the negative focal length of the second component. To a certain extent the axial length may also be influenced by the freely selectable ratio of the focal length of the front component to the focal length of the basic lens group, a relatively large focal length of the basic lens group requiring a relatively short focal length of the front component.

In that way the distance between two infinitesimally thin lenses replacing the first and the second component may become negative, so that on the one hand the axial length is reduced but on the other hand the front component has to be of the so-called retrofocus type, i.e. with an image-side principal point lying outside the front component. Our present invention is designed to avoid the need for a front component of this description, not only because the same is expensive to manufacture but also because the large diameters of the beams in the diaphragm area, which are caused by a basic lens group of relatively large focal length for a given aperture ratio, are incompatible with the desire for a compact construction.

The aim of the invention is to produce an uncomplicated pancratic objective, easy to manufacture, which at the expense of a slight loss of brightness toward the image edges can be reduced in its physical dimensions and has a high performance value $Z$ compared to known objectives of comparable quality and kind. According to the invention, we realize $Z > 4$ by letting the minimum overall focal length $f_{Gmin}$ and the individual focal length $f_{II}$ of the negative, axially movable second component satisfy the following inequality:

$$(f_{Gmin} - f_{II}) < 6y \text{ or } f_{II} > f_{Gmin} - 6y,$$

the term $6y$ being three times the image diagonal $2y$.

In order to avoid reproduction errors it will be advantageous to build up the positive front component as well as the negative second component from several lenses, specifically four lenses in the case of the front component. This is not contradictory to the demand for an inexpensive and uncomplicated structure since, by virtue of the resulting distribution of the refractive powers over a multiplicity of surfaces, not only can the individual lenses be given advantageous shapes so that in the front component no radius of curvature is smaller than the diameter of the respective lens, but also no axial thickness exceeds 15 percent of the respective diameter. This is very important with respect to a cost-saving construction. Moreover these lenses may be manufactured of relatively inexpensive optical glasses of moderate index of refraction and Abbe numbers.

A further aim of the invention is to produce an objective of variable focal length by means of which objects at a widely variable distance, between infinity and a few millimeters forwardly of the front lens of the objective, may be reproduced without additional auxiliary means and without loss of reproduction quality. In the objective according to our invention, reproduction scales between 1:∞ and 1:—5 are attainable by means of an additional axial displacement of the negative third component. Thus, shots become possible reaching far into the macro range which, as is known, extends between reproduction scales of 1:—10 and 1:—1.

The above and other features of our invention will now be described in detail with reference to the accompanying drawing in which.

Figure 1:
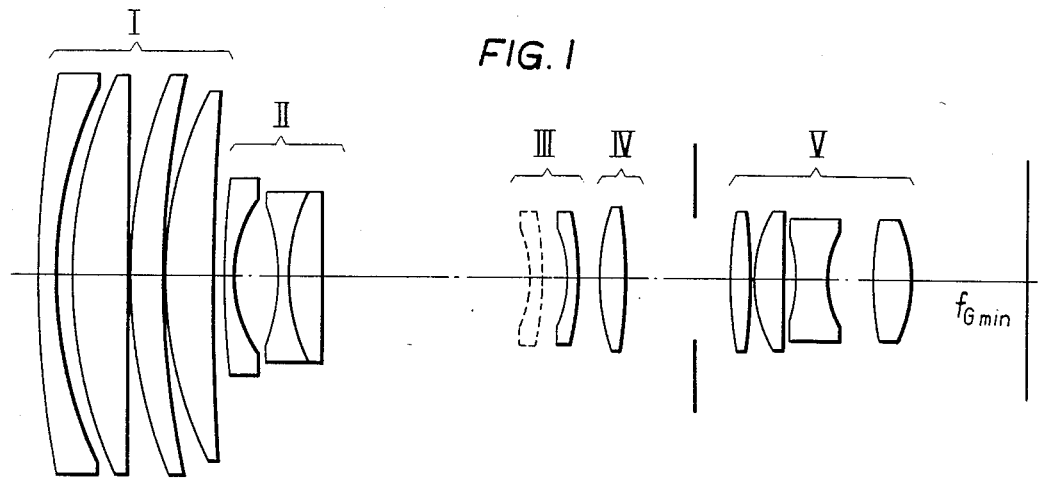
FIG. 1 shows a varifocal objective according to the invention in a position of minimum overall focal length.
Figure 2:
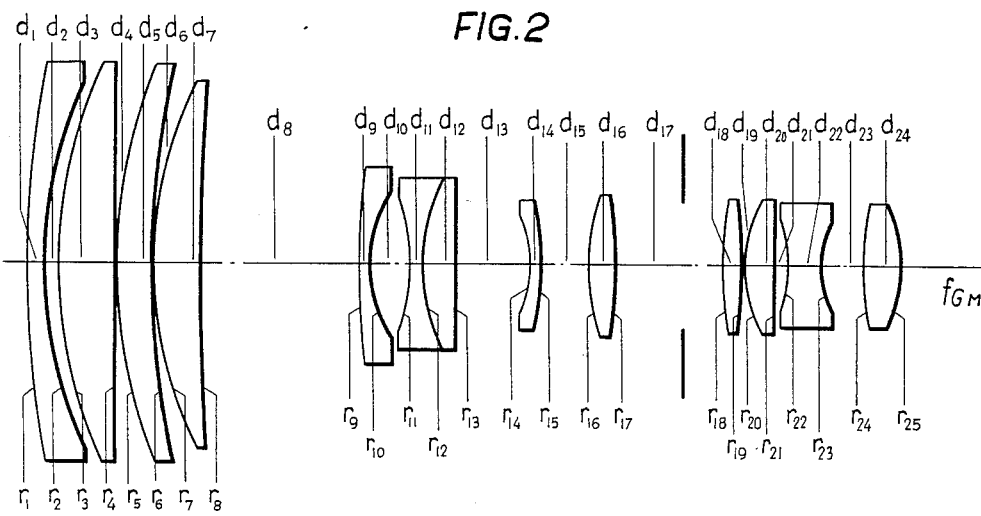
FIG. 2 shows the objective of FIG. 1 in a position of mean overall focal length of unity numerical value.

The objective shown in the drawing consists in known manner of a stationary first component I with positive focal length $f_I$ facing the object, another component II with negative focal length $f_{II}$ movable along the optical axis for the variation of the overall focal length, a further component III with negative focal length $f_{III}$ movable along the optical axis for achieving a constant image plane, and a stationary component IV with positive focal length $f_{IV}$ which collects the diverging light rays behind component III in such a way as to direct them axially to a diaphragm area between component IV and a likewise stationary basic lens group V with positive focal length $f_V$.

In FIG. 1 the position of component III required for macro shots is drawn in broken lines. In that way it is possible to reproduce an object of 21 × 28 mm situated only a few millimeters in front of the vertex of the front lens in full format on the super-8 film. Moreover, short-range focusing independent of the focal length up to 1m is possible by axial displacement of component I, as known per se.

The objective has a five-fold zooming range, as well as a minimum focal length which is 1.2 times smaller than the diameter of the image field. In spite of the extraordinary high light intensity at the extreme image edges, the front-lens diameter is extremely small and amounts to less than the eightfold of the performance value Z, whereas with comparable conventional objectives, which are designed for realization with small dimensions, the front-lens diameter amounts to more than twelve or fourteen times that value. The objective is extraordinarily well corrected over the total range of the overall focal length. With high contrast and resolving power the image is flattened up to the margin, achromatic, and orthoscopic for any selected focal length.

In the following example the letter $r$ signifies the radii of the lens surfaces, the letter $d$ the vertex distances (i.e. lens thicknesses and separations), $n_d$ the refractive indices and $v_d$ the Abbe numbers, the numerical values of parameters $r$ and $d$ being based on a mean focal length $f_{GM} = 1$ occurring when the negative component II reproduces at a scale of 1:1 the intermediate image of an object produced by the positive component I.

| | | | $n_d$ | | $v_d$ |
|---|---|---|---|---|---|
| $r_1 = +6.308$ | | | | | |
| | $d_1 =$ | 0.07 | 1.805 | / | 25.4 |
| $r_2 = +1.967$ | | | | | |
| | $d_2 =$ | 0.06 | | | |
| $r_3 = +2.082$ | | | | | |
| | $d_3 =$ | 0.026 | 1.620 | / | 60.3 |
| $r_4 = \infty$ | | | | | |
| | $d_4 =$ | 0.01 | | | |
| $r_5 = +2.341$ | | | | | |
| | $d_5 =$ | 0.15 | 1.623 | / | 58.1 |
| $r_6 = +4.961$ | | | | | |
| | $d_6 =$ | 0.01 | | | |
| $r_7 = +1.805$ | | | | | |
| | $d_7 =$ | 0.22 | 1.623 | / | 58.1 |
| $r_8 = +12.664$ | | | | | |
| | $d_8$ | 0.04 $f_{Gmin}$ 0.69 $f_{GM}$ 1.03 $f_{Gmax}$ | | | |
| $r_9 = +5.981$ | | | | | |
| | $d_9 =$ | 0.05 | 1.658 | / | 50.9 |
| $r_{10} = +0.567$ | | | | | |
| | $d_{10} =$ | 0.16 | | | |
| $r_{11} = -1.086$ | | | | | |
| | $d_{11} =$ | 0.05 | 1.669 | / | 57.4 |
| $r_{12} = +0.652$ | | | | | |
| | $d_{12} =$ | 0.15 | 1.805 | / | 25.4 |
| $r_{13} = +7.039$ | | | | | |
| | $d_{13}$ | 1.09 $f_{Gmin}$ 0.32 $f_{GM}$ 0.14 $f_{Gmax}$ | | | |
| $r_{14} = -0.639$ | | | | | |
| | $d_{14} =$ | 0.05 | 1.624 | / | 47.0 |
| $r_{15} = -1.288$ | | | | | |
| | $d_{15}$ | 0.10 $f_{Gmin}$ 0.22 $f_{GM}$ 0.06 $f_{Gmax}$ | | | |
| $r_{16} = +1.097$ | | | | | |
| | $d_{16} =$ | 0.10 | 1.691 | / | 54.7 |
| $r_{17} = -3.661$ | | | | | |
| | $d_{17} =$ | 0.46 | | | |
| $r_{18} = -2.052$ | | | | | |
| | $d_{18} =$ | 0.10 | 1.620 | / | 60.3 |
| $r_{19} = -2.052$ | | | | | |
| | $d_{19} =$ | 0.01 | | | |
| $r_{20} = +0.686$ | | | | | |
| | $d_{20} =$ | 0.13 | 1.717 | / | 48.0 |
| $r_{21} = +26.527$ | | | | | |
| | $d_{21} =$ | 0.04 | | | |
| $r_{22} = -0.848$ | | | | | |
| | $d_{22} =$ | 0.16 | 1.785 | / | 26.1 |
| $r_{23} = +0.535$ | | | | | |

-Continued

| | | | $n_d$ | | $v_d$ |
|---|---|---|---|---|---|
| | $d_{23} =$ | 0.18 | | | |
| $r_{24} = +1.614$ | | | | | |
| | $d_{24} =$ | 0.19 | 1.720 | / | 50.4 |
| $r_{25} = -0.639$ | | | | | |

$$f_{Gmin} = 0.43$$
$$f_{II} = -0.60$$
$$f_{GM} = 1.00$$
$$f_{Gmax} = 2.03$$
$$2y = 0.37 \quad Z = 4.07$$

Figure 3:
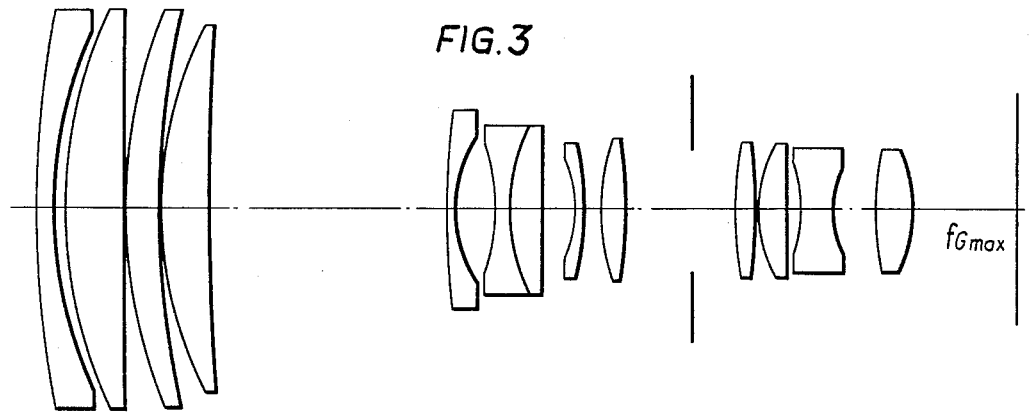
FIG. 3 shows the objective in a position of maximum overall focal length.

From the foregoing numerical values, as well as from the drawing, it will be apparent that the positively refracting front component I of the afocal lens assembly I–IV consists of four singlets all with forwardly convex surfaces, namely a negative meniscus defined by radii $r_1$, $r_2$, a planoconvex lens defined by radii $r_3$, $r_4$, and two further positive menisci defined by radii $r_5$, $r_6$ and $r_7$, $r_8$. The difference $f_{Gmin} - f_{II}$ between the (positive) minimum overall focal length and the (negative) individual focal length of the second component is $$0.43 - (-0.60) = 1.03$$

which is less than $6y = 1.11$. The varifocal ratio $f_{Gmax}/f_{Gmin}$ equals 4.7 as determined by the limiting positions of the axially shiftable components II and III illustrated in FIGS. 1 and 3.

From the foregoing numerical values the remaining individual focal lengths $f_I$, $f_{III}$, $f_{IV}$, $f_V$ can be calculated as follows:

$f_I = +2.168$
$f_{III} = -2.093$
$f_{IV} = +1.237$
$f_V = +1.030$.

What is claimed is:

1. A varifocal objective comprising a positively refracting rear lens group of fixed focal length and a front lens assembly of variable mangification ratio, said lens assembly including:

a positive first component consisting of four simple lenses;

negative second and third components, said second component being movable along the optical axis and having a fixed focal length $f_{II}$, whereas said third component is movable in dependence on the movement of said second component to achieve a constant image plane; and a positive fourth component adjacent to said rear lens group to direct divergent light rays from said third component in substantially axial direction towards said rear lens group;

said components conforming substantially to the parameters of the following table given in order from front to rear with $r_1$ to $r_{25}$ designating the radii of curvature of the lens surfaces, $d_1$ to $d_{24}$ designating the axial thicknesses and separations, $n_d$ designating the indices of refraction and $v_d$ designating the Abbe numbers, $f_{Gmin}$, $f_{GM}$ and $f_{Gmax}$ being the minimum focal length, the mean focal length and the maximum focal length, respectively, $2y$ being the length of the diagonal of the image frame and $Z$ being a performance value calculated according to the formula $$Z = \frac{2y}{f_{Gmin}} \cdot \frac{f_{Gmax}}{f_{Gmin}}$$

| | | | $n_d$ | $v_d$ |
|---|---|---|---|---|
| $r_1 = +6.308$ | | | | |
| | $d_1 =$ | 0.07 | 1.805 / | 25.4 |
| $r_2 = +1.967$ | | | | |
| | $d_2 =$ | 0.06 | | |
| $r_3 = +2.082$ | | | | |
| | $d_3 =$ | 0.026 | 1.620 / | 60.3 |
| $r_4 = \infty$ | | | | |
| | $d_4 =$ | 0.01 | | |
| $r_5 = +2.341$ | | | | |
| | $d_5 =$ | 0.15 | 1.623 / | 58.1 |
| $r_6 = +4.961$ | | | | |
| | $d_6 =$ | 0.01 | | |
| $r_7 = +1.805$ | | | | |
| | $d_7 =$ | 0.22 | 1.623 / | 58.1 |
| $r_8 = +12.664$ | | | | |
| | $d_8$ | 0.04 | $f_{Gmin}$ | |
| | | 0.69 | $f_{GM}$ | |
| | | 1.03 | $f_{Gmax}$ | |
| $r_9 = +5.981$ | | | | |
| | $d_9 =$ | 0.05 | 1.658 / | 50.9 |
| $r_{10} = +0.567$ | | | | |
| | $d_{10} =$ | 0.16 | | |
| $r_{11} = -1.086$ | | | | |
| | $d_{11} =$ | 0.05 | 1.669 / | 57.4 |
| $r_{12} = +0.652$ | | | | |
| | $d_{12} =$ | 0.15 | 1.805 / | 25.4 |
| $r_{13} = +7.039$ | | | | |
| | $d_{13}$ | 1.09 | $f_{Gmin}$ | |
| | | 0.32 | $f_{GM}$ | |
| | | 0.14 | $f_{Gmax}$ | |
| $r_{14} = -0.639$ | | | | |
| | $d_{14} =$ | 0.05 | 1.624 / | 47.0 |
| $r_{15} = -1.288$ | | | | |
| | $d_{15}$ | 0.10 | $f_{Gmin}$ | |
| | | 0.22 | $f_{GM}$ | |
| | | 0.06 | $f_{Gmax}$ | |
| $r_{16} = +1.097$ | | | | |
| | $d_{16} =$ | 0.10 | 1.691 / | 54.7 |
| $r_{17} = -3.661$ | | | | |
| | $d_{17} =$ | 0.46 | | |
| $r_{18} = -2.052$ | | | | |
| | $d_{18} =$ | 0.10 | 1.620 / | 60.3 |
| $r_{19} = -2.052$ | | | | |
| | $d_{19} =$ | 0.01 | | |
| $r_{20} = +0.686$ | | | | |
| | $d_{20} =$ | 0.13 | 1.717 / | 48.0 |
| $r_{21} = +26.527$ | | | | |
| | $d_{21} =$ | 0.04 | | |
| $r_{22} = -0.848$ | | | | |
| $r_{23} = +0.535$ | | | | |
| | $d_{22} =$ | 0.16 | 1.785 / | 26.1 |
| $r_{24} = +1.614$ | | | | |
| | $d_{23} =$ | 0.18 | | |
| $r_{25} = -0.639$ | | | | |
| | $d_{24} =$ | 0.19 | 1.720 / | 50.4 |

$f_{Gmin} = 0.43$
$f_{GM} = 1.00$    $f_{II} = -0.60$
$f_{Gmax} = 2.03$
$Z = 4.07$
$2y = 0.37$ 2. A varifocal objective comprising a positively refracting rear lens group and an afocal front lens assembly of variable magnification ratio, satisfying the relationship $f_{II} > f_{Gmin} - 6y$, $f_{Gmin}$ being the minimum overall focal length of the objective and $2y$ being its image diagonal, said afocal lens assembly including:

a positive first component consisting of four airspaced singlets each having a forwardly convex surface, all but the first of said singlets being positively refracting;

axially shiftable negative second and third components, $f_{II}$ being the individual focal length of said second component; and an axially fixed positive fourth component;

said first, second, third and fourth components and said rear lens group having individual focal lengths $f_I$, $f_{II}$, $f_{III}$, $f_{IV}$ and $f_V$, respectively, of substantially the following numerical values referred to a mean focal length of numerical value unity:

$f_I = +2.168$
$f_{II} = -0.600$
$f_{III} = -2.093$
$f_{IV} = +1.237$
$f_V = +1.030$.

3. A varifocal objective as defined in claim 2 wherein said singlets are, from front to rear, a negative meniscus, a planoconvex lens and two positive menisci.

4. A varifocal objective as defined in claim 2 wherein said second and third components have limiting axial positions defining a varifocal ratio $f_{Gmax}/f_{Gmin}$ of substantially 4.7.

* * * * *